(12) United States Patent
Yokoyama et al.

(10) Patent No.: US 7,684,289 B2
(45) Date of Patent: Mar. 23, 2010

(54) ACTUATOR FOR OPTICAL PICKUP, OPTICAL PICKUP, AND APPARATUS FOR READING OR RECORDING INFORMATION

(75) Inventors: Yoshihiko Yokoyama, Kobe (JP); Mitsuhiro Toyota, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 1730 days.

(21) Appl. No.: 10/780,555

(22) Filed: Feb. 19, 2004

(65) Prior Publication Data
US 2004/0228228 A1 Nov. 18, 2004

(30) Foreign Application Priority Data
Feb. 19, 2003 (JP) ............... P2003-041666

(51) Int. Cl.
G11B 7/09 (2006.01)
G11B 7/135 (2006.01)
(52) U.S. Cl. ............... 369/44.14; 369/44.15; 359/813; 359/814
(58) Field of Classification Search ........... 369/112.17, 369/44.14, 44.15, 13.23, 149, 44.16, 44.21, 369/44.32, 44.22, 220; 359/824, 814, 813, 359/823, 681, 659, 298
See application file for complete search history.

(56) References Cited

U.S. PATENT DOCUMENTS

| | | | | |
|---|---|---|---|---|
| 4,823,219 A | * | 4/1989 | Ueda et al. ............ | 369/220 |
| 5,191,484 A | * | 3/1993 | Yeon et al. ............ | 369/44.14 |
| 5,561,648 A | * | 10/1996 | Song .................... | 369/44.15 |
| 6,091,553 A | * | 7/2000 | Song et al. ............ | 369/44.14 |
| 6,542,319 B2 | * | 4/2003 | Kato et al. ............ | 369/112.17 |
| 6,621,618 B1 | * | 9/2003 | Kaaden et al. ......... | 369/44.15 |
| 2004/0066714 A1 | * | 4/2004 | Ikawa et al. .......... | 369/44.16 |

FOREIGN PATENT DOCUMENTS

| | | |
|---|---|---|
| EP | 0997889 A1 * | 3/2000 |
| JP | 63-187424 | 8/1988 |
| JP | 6-333252 | 12/1994 |
| JP | 7-244861 | 9/1995 |
| JP | 8-321062 | 12/1996 |
| JP | 11-306563 | 11/1999 |
| JP | 2000-11412 | 1/2000 |
| JP | 2002-367200 | 12/2002 |

* cited by examiner

*Primary Examiner*—Hoa T Nguyen
*Assistant Examiner*—Kim-Kwok Chu
(74) *Attorney, Agent, or Firm*—Wenderoth, Lind & Ponack, L.L.P.

(57) ABSTRACT

A high reading performance is secured in an optical pickup even if magnets are miniaturized. In an optical pickup, around a lens holder which holds a lens, track coils are wound from a range of a flange of the lens to the outside in a diameter direction. The track coils become close to an optical axis of the lens and close to the center of a magnetic field formed in a unipolar face-to-face type of magnetic circuit, with the result that it is possible to displace so that the optical axis is hard to be tilted and secure a high reading accuracy. By forming a wound line shape of a focus coil and the track coils into a hexagon or the like, it is possible to make curving magnetic fluxes generated around magnetic pole surfaces hard have an affect in the unipolar face-to-face type of magnetic circuit.

17 Claims, 4 Drawing Sheets

B: MAGNETIC FLUX
i: COIL ELECTRIC CURRENT
F: DRIVING FORCE
⊙: DIRECTION FROM SHEET SURFACE TO FRONT
⊗: DIRECTION FROM SHEET SURFACE TO BACK

B: MAGNETIC FLUX
i: COIL ELECTRIC CURRENT
F: DRIVING FORCE
(⊙: DIRECTION FROM SHEET SURFACE TO FRONT
⊗: DIRECTION FROM SHEET SURFACE TO BACK)

ACTUATOR FOR OPTICAL PICKUP, OPTICAL PICKUP, AND APPARATUS FOR READING OR RECORDING INFORMATION

BACKGROUND OF THE INVENTION

1. Field of the Invention

The present invention relates to an actuator for an optical pickup which displaces a lens in order to read or write information from or to an optical disk.

2. Description of the Related Art

For the purpose of reading information from an optical disk such as a CD (compact disk) and a DVD (digital versatile disk) and recording information to the optical disk, an optical pickup has been used. The optical pickup is provided with a lens for condensing light onto an information record track of the optical disk, and is moved in a direction of the diameter of the optical disk by an external mechanism. To securely access information densely recorded on the optical disk, the optical pickup itself is also provided with a focusing mechanism which displaces the lens along an optical axis so that the lens moves close to or away from the surface of the optical disk, and an actuator which enables tracking of displacement of the lens outward or inward in the diameter direction of the optical disk.

Figure 4:
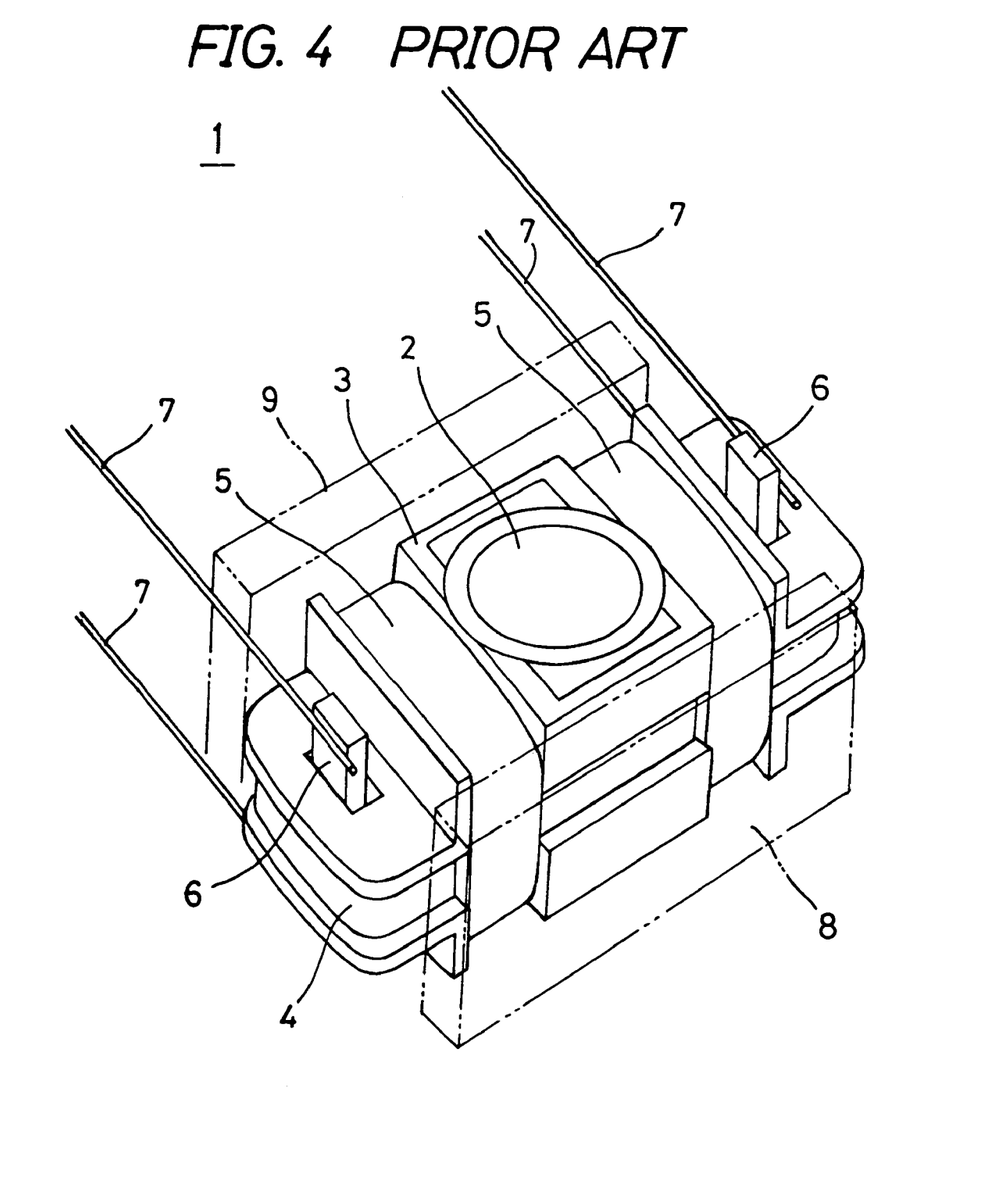
FIG. 4 is a perspective view showing a schematic structure of a conventional optical pickup.

FIG. 4 shows an enlarged schematic structure of a conventional optical pickup 1. In the optical pickup 1, a lens 2 is held so as to face an optical disk, which would be located above the lens 2 as seen in FIG. 4. The lens 2 is held by a lens holder 3, which holds a peripheral portion of the lens 2. Around the lens holder 3, a focus coil 4 is wound about an optical axis of the lens 2. A pair of track coils 5 are also wound around the lens holder 3 about an axial line parallel to long sides of the focus coil 4, which is substantially rectangular. On both sides of the pair of track coils 5, terminals 6 for applying an electric current to the focus coil 4 and the track coils 5 are disposed. Front ends of suspension wires 7, which have electrical conductivity and elasticity, are joined to the terminals 6, respectively.

The optical pickup 1 of FIG. 4 is supported in an elastic state by the suspension wires 7 between magnets 8, 9, which are plate-like permanent magnets placed so as to face each other as shown by a phantom line. The magnets 8, 9 are magnetized in a direction of plate thickness so that facing surfaces have the same magnetic pole. A magnetic circuit structured by the pair of magnets 8, 9 as described above is referred to as a unipolar face-to-face type of magnetic circuit.

Figure 5:
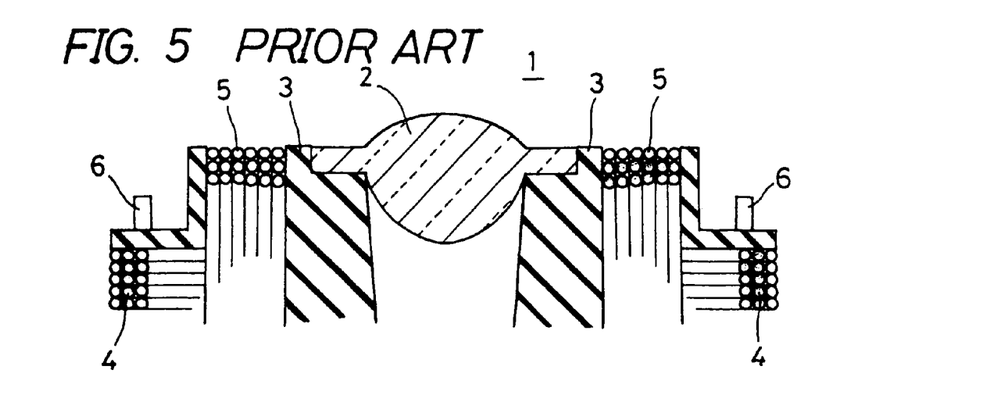
FIG. 5 is a cross sectional view taken from a direction perpendicular to an optical axis to show a structure of an area around a portion holding a lens in the optical pickup of FIG. 4.

FIG. 5 shows a cross sectional structure of an area around a portion which holds the lens 2 in the optical pickup 1 of FIG. 4. The lens holder 3 holds a flange portion disposed on the periphery of the lens 2. The track coil 5 has a side end in a position more outward in the diameter direction than the flange portion of the lens 2, and is wound around to a position further outward in the diameter direction.

Figure 6A:
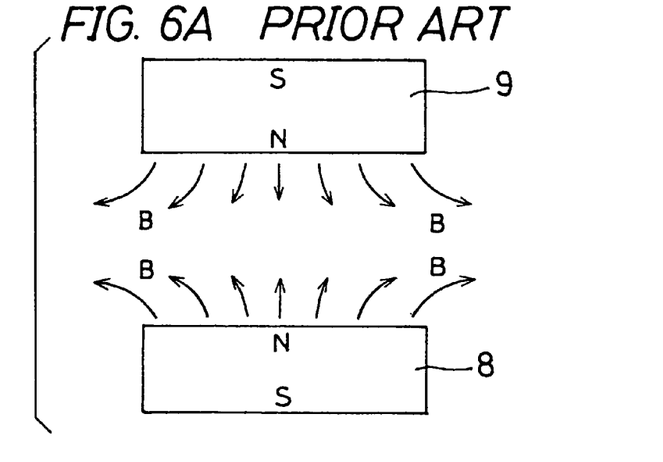
FIGS. 6A and 6B are schematic cross sectional views taken from a direction parallel to the optical axis of the lens to show a direction of a magnetic flux generated between magnets and a force acting on a focus coil in the optical pickup of FIG. 4.
Figure 6B:
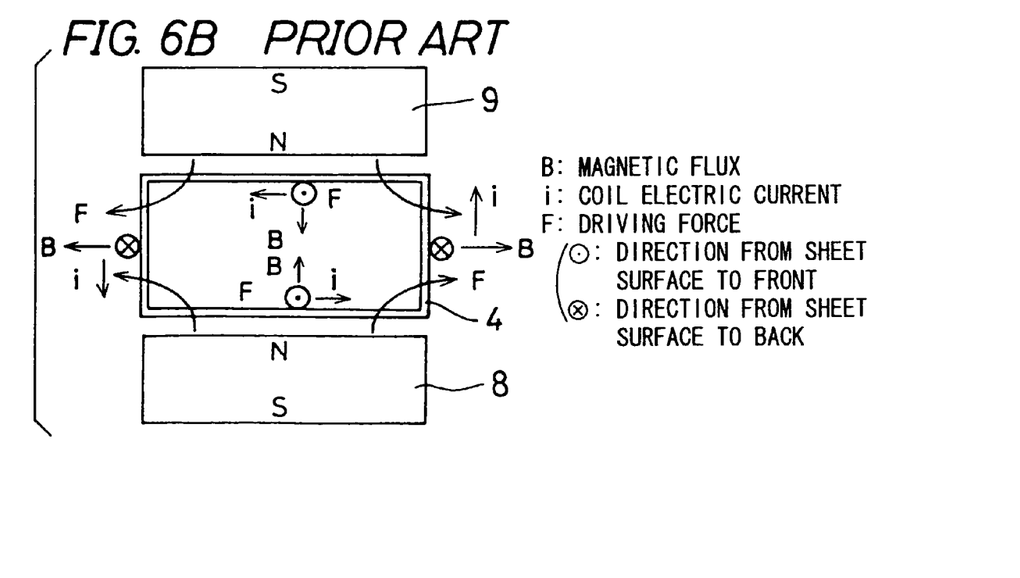

FIG. 6A shows a direction of a magnetic flux B generated in the unipolar face-to-face type of magnetic circuit, and FIG. 6B shows a force generated at the focus coil 4. As shown in FIG. 6A, the magnets 8, 9 are placed so that magnetic poles of the same polarity face each other, and therefore, the magnetic fluxes B generated from magnetic pole surfaces repel each other and curve, spreading from the center to the outside. By placing the focus coil 4 having a substantially rectangular wound line shape in a space between the magnetic pole surfaces where the magnetic fluxes B are generated as described above, and applying an electric current thereto, a force is generated according to Fleming's left-hand rule by an electromagnetic mutual action of the electric current and the magnetic fluxes, and the focus coil 4 is driven.

It is general that the wound line shape of the focus coil 4 is basically rectangular, and substantially, only corners are curved. In the case of, for example, angularly displacing a portion corresponding to the lens holder about an axial line which is parallel to the optical axis and thereby enabling a plurality of objective lenses to switch, as disclosed in Japanese Unexamined Patent Publication JP-A 8-321062 (1996), there is a case in which track coils having a wound line shape including a lot of curved portions are used.

According to the optical pickup 1 as shown in FIG. 4, when displaced while the optical axis of the lens 2 stays perpendicular to the surface of the optical disk, the lens 2 can form an ideal spot shape on the optical disk by reducing light from a light source such as laser light, with the result that it is possible to secure a higher reading performance. In other words, it is important to displace the lens 2 while keeping the lens parallel to the surface of the optical disk. However, as to keeping the lens 2 parallel, the actuator which generates a force in the unipolar face-to-face type of magnetic circuit has problems as described below.

1) As shown in FIG. 6B, the strength and direction of the magnetic flux B passing through the track coil 5 deviates more from a direction perpendicular to the surfaces of the magnets 8, 9 in a position farther away from the center of a magnetic field. Therefore, as the track coil 5 is placed close to the center of the magnetic field, the lens 2 can be displaced in parallel to the surface of the optical disk. However, in a case where the lens holder 3 has the structure as shown in FIG. 5, the track coil 5 is blocked by the lens 2, and therefore, there is a restriction that the track coil 5 cannot be placed more inward than the lens 2 in the diameter direction. Although making the magnets 8, 9 larger with respect to the track coil 5 enables placement of the track coil 5 in a position relatively closer to the center of the magnetic field, it hinders miniaturization.

2) On the other hand, at the focus coil 4, because of the wound line shape thereof, unnecessary forces are generated by the magnetic fluxes B on both sides which do not face the magnetic pole surfaces of the magnets 8, 9, that is, on short sides in FIG. 6B. Since these unnecessary forces vary in accordance with a distance from the center of the magnetic field, when the lens 2 is displaced in a direction of placing the track coils 5, that is, a direction parallel to the long sides of the focus coil 4, the unnecessary forces generated on the short sides do not keep balance any more, and become forces tilting the lens 2 with respect to the optical axis. When the lens 2 is tilted with respect to the optical axis, it is impossible to form the aforementioned ideal spot shape, and it becomes difficult to secure a high reading performance. In order to make the force balance hard to be destroyed even though the lens 2 is moved, there is a need to use magnets 8, 9 having large magnetic pole surfaces, which hinders miniaturization.

SUMMARY OF THE INVENTION

An object of the present invention is to provide an actuator for an optical pickup, an optical pickup, and an apparatus for reading or recording information, which are capable of securing a high reading performance even when magnets are miniaturized.

The invention provides an actuator for an optical pickup comprising a track coil for driving a lens member to move inward or outward in a diameter direction of an optical disk. At least part of the track coil is placed in a position closer to an optical axis than an end portion of the lens member.

Further, the invention provides an optical pickup comprising a lens member and a track coil for driving the lens member to move inward or outward in a diameter direction of an optical disk. At least part of the track coil is placed in a position closer to an optical axis than an end portion of the lens member.

Still further, the invention provides an apparatus for reading or recording information from or to an optical disk comprising an optical pickup for condensing light in order to read or record information, the optical pickup comprising a lens member and a track coil for driving the lens member to move inward or outward in a diameter direction of the optical disk. At least part of the track coil is placed in a position closer to an optical axis than an end portion of the lens member.

According to the invention, the track coil for driving the lens member to move inward or outward in the diameter direction of the optical disk is provided. Since the part of the track coil is placed so as to be closer to the optical axis than the end portion of the lens member, it becomes close to the optical axis of the lens member and close to the center of a magnetic field, with the result that it is possible to displace in such a manner that the optical axis is hard to be tilted and secure high reading accuracy. Since it is possible to place the track coil so as to be close to the optical axis of the lens member, it is possible to reduce the size and weight of the optical pickup. By setting a placement position of the track coil more outward than an optical path about the optical axis of the lens member, it is possible to avoid that the track coil hinders reading or writing of information via the lens in the optical pickup.

Still further, the invention provides an actuator for an optical pickup comprising magnets placed in such a manner that magnetic pole surfaces thereof face each other. A focus coil drives a lens member to move close to or away from an optical disk and a track coil drives the lens member to move inward or outward in a diameter direction of the optical disk. At least one of the focus coil and the track coil has a wound line shape such that sides thereof facing the magnetic pole surfaces are sides parallel to the magnetic pole surfaces, respectively, and portions which join both ends of the facing sides partially bulge outward in the diameter direction.

Still further, the invention provides an optical pickup comprising a lens member, magnets placed in such a manner that magnetic pole surfaces thereof face each other, a focus coil for driving the lens member to move close to or away from an optical disk and a track coil for driving the lens member to move inward or outward in a diameter direction of the optical disk. At least one of the focus coil and the track coil has a wound line shape such that sides thereof facing the magnetic pole surfaces are sides parallel to the magnetic pole surfaces, respectively. Portions which join both ends of the facing sides partially bulge outward in the diameter direction.

According to the invention, the focus coil for driving the lens member to move close to or away from the optical disk and the track coil for driving to move inward or outward in the diameter direction of the optical disk are provided. At least one of the focus coil and the track coil has a wound line shape such that sides thereof facing the magnetic pole surfaces are sides parallel to the magnetic pole surfaces, respectively, and portions which join both the ends of the facing sides partially bulge outward in the diameter direction. Magnetic fluxes generated perpendicularly from the respective magnetic pole surfaces act on the sides facing the magnetic pole surfaces, which are long sides of the wound line shape. Because of an electromagnetic mutual action of the magnetic fluxes and an electric current flowing through the long sides, a force to displace the lens member in the direction of the optical axis is generated. The portions which join both the ends of the facing sides are shaped so as to partially bulge outward in the diameter direction. At these portions, the direction of the magnetic flux formed between the magnetic pole surfaces also deviates outward in the middle between the magnetic pole surfaces, with the result that the deviating direction of the magnetic flux and the wound line partially bulging outward in the diameter direction form a small angle and become almost parallel. Becoming almost parallel decreases the electromagnetic mutual action of the magnetic flux and the electric current, so that it is possible to decrease a force to tilt the optical axis of the lens member and secure high reading accuracy.

Still further, the invention provides an actuator for an optical pickup comprising magnets placed in such a manner that magnetic pole surfaces thereof face each other, a focus coil for driving a lens member to move close to or away from an optical disk and a track coil for driving the lens member to move inward or outward in a diameter direction of the optical disk. At least part of the track coil is placed in a position closer to an optical axis than an end portion of the lens member. At least one of the focus coil and the track coil has a wound line shape such that sides thereof facing the magnetic pole surfaces are sides parallel to the magnetic pole surfaces, respectively, and portions which join both ends of the facing sides partially bulge outward in the diameter direction.

Still further, the invention provides an optical pickup comprising a lens member, magnets placed in such a manner that magnetic pole surfaces thereof face each other, a focus coil for driving the lens member to move close to or away from an optical disk and a track coil for driving the lens member to move inward or outward in a diameter direction of the optical disk. At least part of the track coil is placed in a position closer to an optical axis than an end portion of the lens member, and at least one of the focus coil and the track coil has a wound line shape such that sides thereof facing the magnetic pole surfaces are sides parallel to the magnetic pole surfaces, respectively. Portions which join both ends of the facing sides partially bulge outward in the diameter direction.

According to the invention, the track coil for driving the lens member to move inward or outward in the diameter direction of the optical disk, and the focus coil for driving the lens member to move close to or away from the optical disk, are provided.

Since the part of the track coil is placed so as to be closer to the optical axis than the end portion of the lens member, it locates close to the optical axis of the lens member and close to the center of a magnetic field, with the result that it is possible to displace so that the optical axis is hard to be tilted and secure high reading accuracy. Since it is possible to place the track coil so as to be close to the optical axis of the lens member, it is possible to reduce the size and weight of the optical pickup. By setting a placement position of the track coil more outward than an optical path about the optical axis of the lens, it is possible to avoid that the track coil hinders reading or writing of information via the lens in the optical pickup.

At least one of the focus coil and the track coil has a wound line shape such that sides thereof facing the magnetic pole surfaces are sides parallel to the magnetic pole surfaces, respectively, and portions which join both the ends of the facing sides partially bulge outward in the diameter direction. Magnetic fluxes generated perpendicularly from the respective magnetic pole surfaces act on the sides facing the magnetic pole surfaces, which become long sides of the wound line shape. Because of an electromagnetic mutual action of the magnetic fluxes and an electric current flowing through the long sides, a force to displace the lens member in the direction of the optical axis is generated. The portions which join both the ends of the facing sides are shaped so as to partially bulge outward in the diameter direction. At these portions, the direction of the magnetic flux formed between the magnetic pole surfaces also deviates outward in the middle between the magnetic pole surfaces, with the result that the deviating direction of the magnetic flux and the wound line partially bulging outward in the diameter direction form a small angle and become almost parallel. Becoming almost parallel decreases the electromagnetic mutual action of the magnetic flux and the electric current, so that it is possible to decrease a force to tilt the optical axis of the lens member and secure high reading accuracy.

Still further, in the invention, the wound line shape is a hexagon.

According to the invention, in at least one of the focus coil and the track coil, it is possible, at the long sides of the hexagon of the wound line shape, to make an electromagnetic mutual action perpendicularly to the magnetic fluxes generated from the magnetic pole surfaces and efficiently generate a force to drive the lens, and it is possible, at the portions which join both the ends of the long sides, to decrease an unnecessary force generated by the electromagnetic mutual action with the magnetic fluxes at linear portions slanted according to the curving magnetic fluxes and make the tilt of the optical axis of the lens small.

Still further, the invention provides an actuator for an optical pickup comprising a holder having, on a surface facing an optical disk, a holding portion for holding an outer peripheral portion of a lens member from a side of one surface of the lens member whose other surface faces the optical disk, and an opening portion for an optical path about an optical axis of the lens member inside the holding portion in a diameter direction. The holder further has, around the optical path, a bobbin portion for winding a focus coil, and a bobbin portion for winding a track coil around which the track coil is wound about an axis parallel to a side of a wound line shape of the focus coil.

Still further, the invention provides an optical pickup comprising a holder having, on a surface facing an optical disk, a holding portion for holding an outer peripheral portion of a lens member from a side of one surface of the lens member whose other surface faces the optical disk, and an opening portion for an optical path about an optical axis of the lens member inside the holding portion in a diameter direction. The holder further has, around the optical path, a bobbin portion for winding a focus coil, and a bobbin portion for winding a track coil around which the track coil is wound about an axis parallel to a side of a wound line shape of the focus coil.

According to the invention, the outer peripheral portion of the lens member is held by the holding portion of the holder, the focus coil is wound around the bobbin portion for winding the focus coil, and the track coil is wound around the bobbin portion for winding the track coil. It is thereby possible to form an optical pickup which is small in size and in which the tilt of the optical axis of the lens member is small.

Still further, the invention provides an actuator for an optical pickup comprising a lens holder for holding a lens member and a track coil for driving the lens member to move inward or outward in a diameter direction of an optical disk. An outer end portion of the lens holder in the diameter direction of the optical disk is placed in a position closer to an optical axis than an end portion of the lens member.

Still further, the invention provides an optical pickup comprising a lens member, a lens holder for holding the lens member and a track coil for driving the lens member to move inward or outward in a diameter direction of an optical disk. An outer end of the lens holder in the diameter direction of the optical disk is placed in a position closer to an optical axis than an end portion of the lens member.

Still further, in the invention, a portion of the lens member held by the lens holder is a flange.

According to the invention, the lens holder for holding the lens member, and the track coil for driving the lens member to move inward or outward in the diameter direction of the optical disk, are provided. The outer end portion of the lens holder in the diameter direction of the optical disk is placed in a position closer to the optical axis of the lens member than the end portion of the lens member, and the flange of the lens member is held by the lens holder. Thus, it is possible to place an inner portion, which is a portion on a side of the lens holder, of the track coil so as to be closer to the optical axis than the end portion of the lens member, and it is possible to displace so that the optical axis is hard to be tilted and secure high reading accuracy. Since it is possible to place the track coil so as to be close to the optical axis of the lens member, it is possible to reduce the size and weight of the optical pickup. Moreover, since the track coil is placed so as to overlap the flange portion, it is possible to downsize the track coil in a range of not hindering an optical action of the lens member.

BRIEF DESCRIPTION OF THE DRAWINGS

Other and further objects, features, and advantages of the invention will be more explicit from the following detailed description taken with reference to the drawings wherein.

DETAILED DESCRIPTION

Now referring to the drawings, preferred embodiments of the invention are described below.

Figure 1:
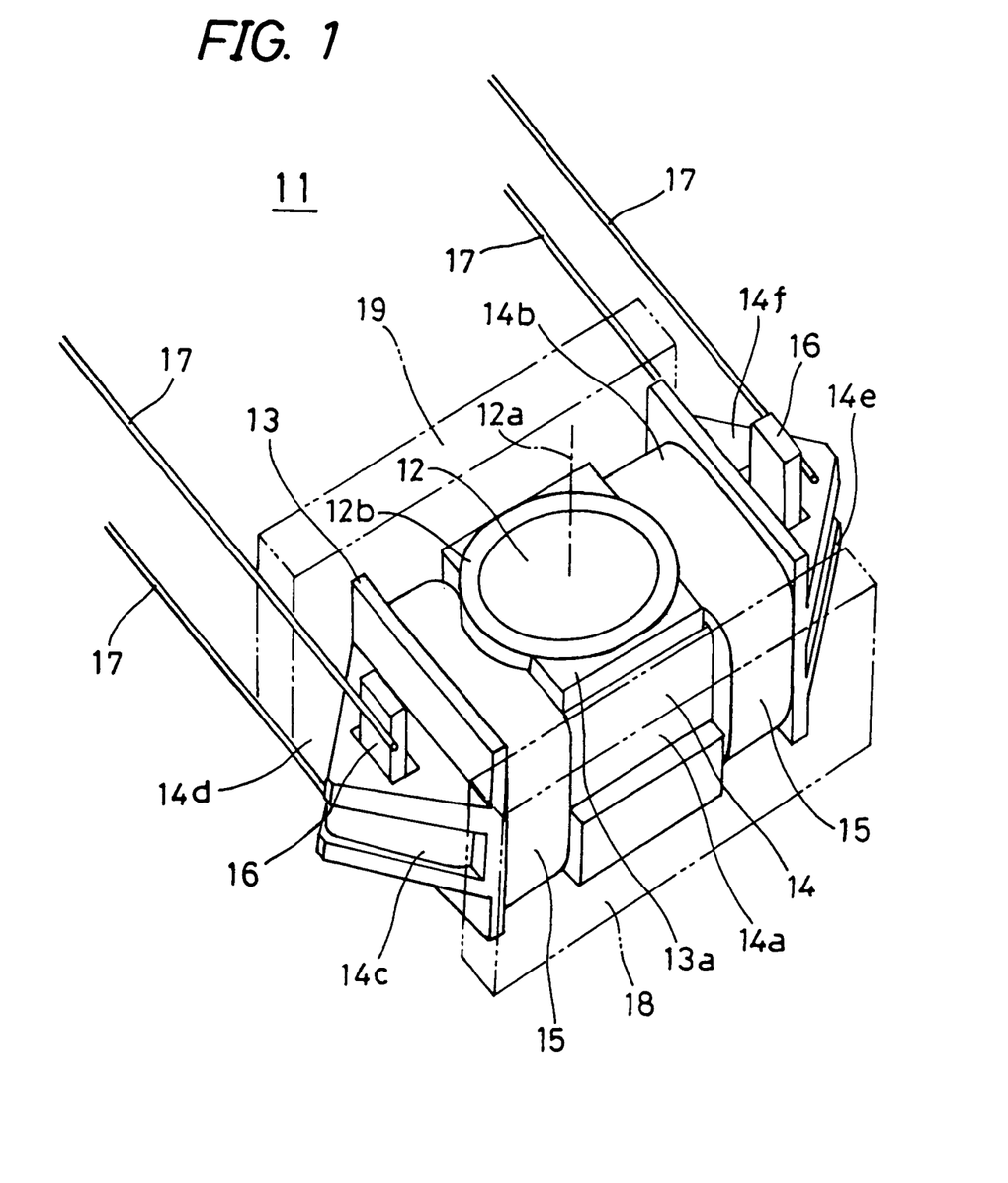
FIG. 1 is a perspective view showing a schematic structure of an optical pickup, which is an embodiment of the present invention.

FIG. 1 shows a schematic structure of an optical pickup 11, which is an embodiment of the present invention. The optical pickup 11 of the present embodiment also uses a driving force generated by an electromagnetic mutual action between magnetic pole surfaces of a unipolar face-to-face type of magnetic circuit in the same manner as the conventional optical pickup 1 shown in FIG. 4. In the optical pickup 11, a lens 12 which is transparent and made of synthetic resin is held so as to face an optical disk that will be located above the lens 12 as seen in FIG. 1. The lens 12 is held so that an optical axis 12a thereof becomes perpendicular to the surface of the optical disk. The lens 12 is held by a lens holder 13 made of synthetic resin, which holds a peripheral flange portion 12b of the lens 12.

Around the lens holder 13, a focus coil 14 is wound about the optical axis 12a of the lens 12.

Figure 3:
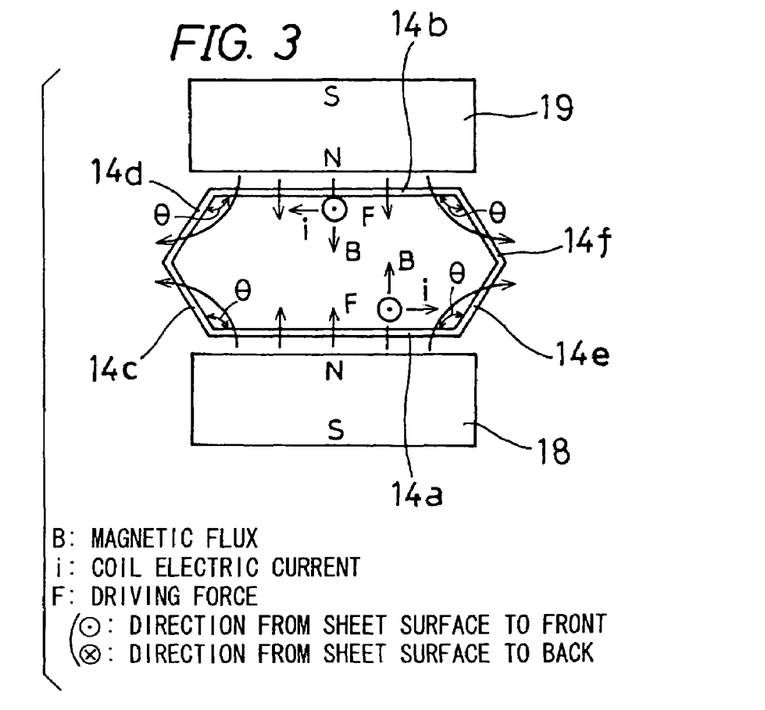
FIG. 3 is a schematic cross sectional view taken from a direction parallel to the optical axis of the lens to show a force acting on a focus coil in the optical pickup of FIG. 1.

A wound line shape of the focus coil 14 of the embodiment is a substantially flat hexagon, and long side portions 14a, 14b face each other in parallel. Both ends of the long side portions 14a, 14b are joined by two short side portions 14c, 14d, and 14e, 14f, respectively. As shown in FIG. 3 described below, the short side portions 14c, 14d, and 14e, 14f are slanted so that angles θ formed by the short side portions and the long side portions 14a, 14b are larger than 90°.

About an axial line parallel to the long side portions 14a, 14b of the focus coil 14, a pair of track coils 15 are wound around the lens holder 13. Inner side ends of the pair of track coils 15 locate within a range of the flange 12b of the lens 12. On both sides of the pair of track coils 15, terminals 16 for applying an electric current to the focus coil 14 and the track coils 15 are disposed. Front ends of suspension wires 17 having electrical conductivity and elasticity are joined to the terminals 16, respectively.

The optical pickup 11 is supported in an elastic manner by the suspension wires 17 between magnets 18, 19, which are plate-like permanent magnets placed so as to face each other as shown by a phantom line. In the same manner as the magnets 8, 9 of FIG. 4, the magnets 18, 19 are magnetized in a direction of plate thickness so that facing surfaces are at the same magnetic pole.

Figure 2:
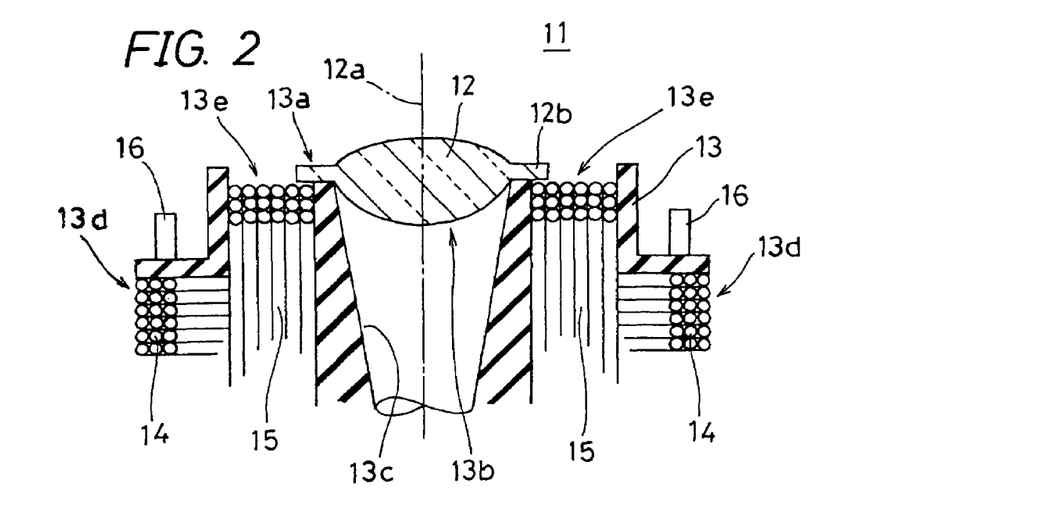
FIG. 2 is a cross sectional view taken from a direction perpendicular to an optical axis to show an area around a portion holding a lens in the optical pickup of FIG. 1.

FIG. 2 shows a cross sectional structure of an area around a portion holding the lens 12 in the optical pickup 11 of FIG. 1. On the surface of the lens holder 13 is formed a holding portion 13a which holds the flange portion 12b disposed on the periphery of the lens 12. In the center of the holding portion 13a is formed an opening portion 13b which faces a portion more inward than the flange 12b of the lens 12. From the opening portion 13b to the inside of the lens holder 13, an optical path portion 13c is formed along the optical axis 12a. A focus coil bobbin portion 13d around which the focus coil 14 is wound is formed around the optical path portion 13c about the optical axis, and formed so that a cross sectional shape perpendicular to the optical axis 12a becomes a flat hexagon. Note that, in the invention, "flat hexagon" indicates a hexagon in a case where lengths of facing sides are the same and lengths of sides adjacent thereto are different from the facing sides. A track coil bobbin portion 13e, around which the tracking coil 15 is wound, is formed about an axial line perpendicular to the optical axis 12a, extending outward in the diameter direction from the range of the flange portion 12b of the lens 12. The lens 12 may not be provided with the flange 12b. On this occasion, the holding portion 13a holds a peripheral portion inside the outermost periphery of the lens 12. The opening portion 13b is formed so as to face a portion more inward than the peripheral portion. The track coil bobbin portion 13e is formed within a range where the holding portion 13a is disposed.

That is to say, the track coil 15 is wound around so that one side end thereof locates more inward in the diameter direction than the outermost periphery of the lens 12 and more outward than an optical path about the optical axis 12a of the lens 12, and the other side end thereof locates outward in the diameter direction of the lens 12, on one surface of the lens 12 whose other surface faces the surface of the optical disk. Since the one side end of the track coil 15 locates more inward in the diameter direction than the outmost periphery of the lens 12, it locates close to the optical axis 12a of the lens 12 and close to the center of a magnetic field formed in the unipolar face-to-face type of magnetic circuit, with the result that it is possible to displace so that the optical axis 12a is hard to be tilted and secure high reading accuracy. Since it is possible to place the track coil 15 so as to be close to the optical axis 12a of the lens 12, it is possible to reduce the size and weight of the optical pickup 11. Since the track coil 15 is placed more outward than the optical path about the optical axis 12a of the lens 12, it is possible to avoid that the track coil 15 hinders reading or writing of information via the lens 12 in the optical pickup 11.

FIG. 3 shows a force generated at the focus coil 14 having a hexagonal wound line shape. Since the magnets 18, 19 are placed so that magnetic poles of the same polarity face each other in the same manner as the magnets 8, 9 of FIG. 6A, magnetic fluxes B generated from the magnetic pole surfaces repel each other and curve spreading from the center to the outside. In the case of placing the focus coil 14 having a substantially hexagonal wound line shape in a space between the magnetic pole surfaces where the magnetic fluxes B are generated as described above, and applying an electric current thereto, the direction of the electric current and the directions of the magnetic fluxes form small angles and become almost parallel with respect to the short sides 14c, 14d, and 14e, 14f in positions where the magnetic fluxes B curve. A force generated according to Fleming's left-hand rule by an electromagnetic mutual action, which is calculated by an exterior operation of vectors, becomes zero in a complete parallel state. Since the angles formed by the electric current and the magnetic fluxes are small, a force to drive the short sides 14c, 14d, and 14e, 14f is also small, with the result that it is possible to make the optical axis 12a of the lens 12 hard to be tilted.

In the wound line shape of the focus coil 14, both the ends of the parallel long side portions 14a, 14b can be joined by not only the linear short side portions 14c, 14d, and 14e, 14f bulging outward in the diameter direction so as to become a hexagon, but also curved lines bulging outward in the diameter direction. Anyway, magnetic fluxes generated perpendicularly from the respective magnetic pole surfaces of the magnets 18 19 act on the linear portions, which are the long side portions 14a, 14b of the focus coil 14. By the electromagnetic mutual action of the magnetic fluxes and the electric current flowing through the long side portions 14a, 14b, a force to displace the lens 12 along a direction of the optical axis 12a is generated. The portions which join both the ends of the linear long side portions 14a, 14b are shaped in such a manner that middle portions thereof bulge outward in the diameter direction. At these portions, the direction of the magnetic flux formed between the magnetic pole surfaces of the unipolar face-to-face type of magnetic circuit also deviates outward in the middle between the magnetic pole surfaces, with the result that the deviating direction of the magnetic flux and the wound line whose middle portion bulges outward in the diameter direction form a small angle and become almost parallel. Becoming almost parallel decreases the electromagnetic mutual action of the magnetic flux and the electric current, with the result that it is possible to decrease a force to tilt the optical axis 12a of the lens 12 and secure high reading accuracy.

Further, also in the direction of the axial line 12a of the lens 12, the magnetic fluxes B curve around a gap where the magnetic pole surfaces of the magnets 18, 19 face each other. Therefore, by shaping the wound line of the track coil 15 in such a manner that portions facing the magnetic pole surfaces of the magnets 18, 19 become linear and portions which join the linear portions are formed into a shape bulging outward in the diameter direction, for example, a hexagon, it is possible to suppress generation of an unnecessary force.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An actuator for an optical pickup which includes a lens member having an outermost end portion in a diametrical direction of said lens member and an optical axis, said actuator comprising:
   a track coil for driving the lens member to move, in the diametrical direction, inward or outward with respect to an optical disk;
   wherein at least part of said track coil is in a position closer to the optical axis of the lens member than the outermost end portion of the lens member; and
   a focus coil wound about the optical axis of the lens member.

2. An actuator for an optical pickup which includes a lens member having an outermost end portion in a diametrical direction of the lens member and an optical axis, said actuator comprising:
   magnets placed in such a manner that magnetic pole surfaces of said magnets face each other;
   a focus coil for driving the lens member to move toward or away from an optical disk; and
   a track coil for driving the lens member in a diametrical direction of said lens member inward or outward with respect to an optical disk;
   wherein at least part of said track coil is in a position closer to the optical axis of the lens member than said outermost end portion of the lens member; and
   wherein at least one of said focus coil and said track coil has a wound line shape that includes first sides thereof facing and parallel to said magnetic pole surfaces of said magnets and second sides thereof that interconnect ends of said first sides, said second sides each bulging outwardly, in a diametrical direction of the respective said coil, from ends of said second sides adjoining said first sides toward a portion of said second sides between said ends of said second sides.

3. The actuator of claim 2, wherein said wound line shape is a hexagon.

4. The actuator of claim 2 wherein said focus coil is wound about the optical axis of said lens member.

5. The actuator of claim 2, wherein said at least one of said focus coil and said track coil having said wound line shape includes at least said focus coil.

6. An actuator for an optical pickup which includes a lens member having one surface for facing an optical disk, another surface on an opposite side thereof, a diametrically outermost peripheral edge and an optical axis, said actuator comprising:
   a holder having
      a holding portion positioned to face the optical disk and having a surface that holds a peripheral portion of the lens member from the opposite side of the other surface of the lens member, said holding portion having an outermost diameter smaller than the outermost peripheral edge of the lens member,
      an opening portion diametrically inside of said holding portion forming an optical path about said optical axis of the lens member,
      a focus coil bobbin portion around said optical path for the winding of a focus coil, and
      a track coil bobbin portion, having an axis parallel to sides of a winding line shape of said focus coil bobbin portion, for winding a track coil.

7. An actuator for an optical pickup which includes a lens member having one surface for facing an optical disk, another surface on an opposite side thereof, a diametrically outermost peripheral edge and an optical axis, said actuator comprising:
   a track coil for driving the lens member in a diametrical direction of the lens member inward or outward with respect to the optical disk;
   a holder positioned to face the optical disk and having a surface that holds a peripheral portion of the lens member from the opposite side of the other surface of the lens member, said holder having an outermost diameter smaller than the outermost peripheral edge of the lens member; and
   a focus coil wound about the optical axis of the lens member.

8. The actuator of claim 7, wherein said holder supports a flange of the lens member.

9. An optical pickup comprising:
   a lens member having an outermost end portion in a diametrical direction of said lens member and an optical axis;
   a track coil for driving said lens member to move, in the diametrical direction, inward or outward with respect to an optical disk;
   wherein at least part of said track coil is in a position closer to said optical axis of said lens member than said outermost end portion of said lens member; and
   a focus coil wound about the optical axis of the lens member.

10. An optical pickup comprising:
    magnets placed in such a manner that magnetic pole surfaces of said magnets face each other;
    a lens member having an outermost end portion in a diametrical direction of said lens member and an optical axis;
    a focus coil for driving said lens member to move toward or away from an optical disk; and
    a track coil for driving said lens member in a diametrical direction of said lens member inward or outward with respect to an optical disk;
    wherein at least part of said track coil is in a position closer to said optical axis of said lens member than said outermost end portion of said lens member; and
    wherein at least one of said focus coil and said track coil has a wound line shape that includes first sides thereof facing and parallel to said magnetic pole surfaces of said magnets and second sides thereof that interconnect ends of said first sides, said second sides each bulging outwardly, in a diametrical direction of the respective said coil, from ends of said second sides adjoining said first sides toward a portion of said second sides between said ends of said second sides.

11. The optical pickup of claim 10, wherein said wound line shape is a hexagon.

12. The optical pickup of claim 10 wherein said focus coil is wound about the optical axis of said lens member.

13. The optical pickup of claim 10, wherein said at least one of said focus coil and said track coil having said wound line shape includes at least said focus coil.

14. An optical pickup comprising:
    a lens member having one surface for facing an optical disk, another surface on an opposite side thereof, a diametrically outermost peripheral edge and an optical axis; and a holder having
- a holding portion positioned to face the optical disk and having a surface that holds a peripheral portion of said lens member from the opposite side of the other surface of the lens member, said holding portion having an outermost diameter smaller than said outermost peripheral edge of said lens member,
- an opening portion diametrically inside of said holding portion forming an optical path about said optical axis of said lens member,
- a focus coil bobbin portion around said optical path for the winding of a focus coil, and
- a track coil bobbin portion, having an axis parallel to sides of a winding line shape of said focus coil bobbin portion, for winding a track coil.

15. An optical pickup comprising:
- a lens member having one surface for facing an optical disk, another surface on an opposite side thereof, a diametrically outermost peripheral edge and an optical axis;
- a track coil for driving the lens member in a diametrical direction of the lens member inward or outward with respect to the optical disk;
- a holder positioned to face the optical disk and having a surface that holds a peripheral portion of said lens member from the opposite side of the other surface of the lens member, said holder having an outermost diameter smaller than said outermost peripheral edge of said lens member; and
- a focus coil wound about the optical axis of the lens member.

16. The optical pickup of claim 15, wherein said lens member comprises a flange and said holder supports said flange.

17. An apparatus for reading or recording information from or to an optical disk comprising:
- an optical pickup for condensing light in order to read or record information, said optical pickup comprising a lens member having an outermost end portion in a diametrical direction of said lens member and an optical axis and a track coil for driving said lens member to move, in the diametrical direction, inward or outward with respect to an optical disk;
- wherein at least part of said track coil is in a position closer to said optical axis of said lens member than said outermost end portion of said lens member; and
- a focus coil wound about the optical axis of the lens member.

* * * * *